United States Patent
Pandya et al.

(10) Patent No.: US 7,818,255 B2
(45) Date of Patent: Oct. 19, 2010

(54) LOGON AND MACHINE UNLOCK INTEGRATION

(75) Inventors: Ravindra N. Pandya, Clyde Hill, WA (US); Paul England, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 11/445,821

(22) Filed: Jun. 2, 2006

(65) Prior Publication Data

US 2007/0282757 A1   Dec. 6, 2007

(51) Int. Cl.
G06F 21/00 (2006.01)
(52) U.S. Cl. .............................. 705/51; 705/50; 705/72; 705/76; 713/193
(58) Field of Classification Search .................... 705/50, 705/51, 72, 76; 713/193
See application file for complete search history.

(56) References Cited

U.S. PATENT DOCUMENTS

| | | | |
|---|---|---|---|
| 5,937,066 A * | 8/1999 | Gennaro et al. ............. | 380/286 |
| 6,421,779 B1 | 7/2002 | Kuroda et al. | |
| 7,020,772 B2 | 3/2006 | England et al. | |
| 2005/0111664 A1* | 5/2005 | Ritz et al. .................... | 380/255 |
| 2008/0195872 A1* | 8/2008 | Chow et al. .................. | 713/193 |
| 2009/0092252 A1* | 4/2009 | Noll et al. .................... | 380/277 |
| 2009/0154705 A1* | 6/2009 | Price et al. ................... | 380/277 |
| 2009/0220089 A1* | 9/2009 | Venkatraman et al. ...... | 380/277 |
| 2010/0115288 A1* | 5/2010 | Monk et al. .................. | 713/189 |

* cited by examiner

*Primary Examiner*—Pierre E Elisca
(74) *Attorney, Agent, or Firm*—Woodcock Washburn LLP

(57) ABSTRACT

A method of avoiding a second login of user information in an encrypted disk computer system includes a communications path for transferring user login information. The login information is acquired and used by a first software module which authenticates the user to decrypt a disk with an encrypted operating system. The same login information is transferred using the communications channel to a second use which logs the user into the decrypted operating system. The method also supports multiple users through maintenance of multiple users credentials.

18 Claims, 6 Drawing Sheets

(Prior Art Method)

Password Protection/ Access Model

Smartcard Protection/ Access Model

Biometric Protection/ Access Model

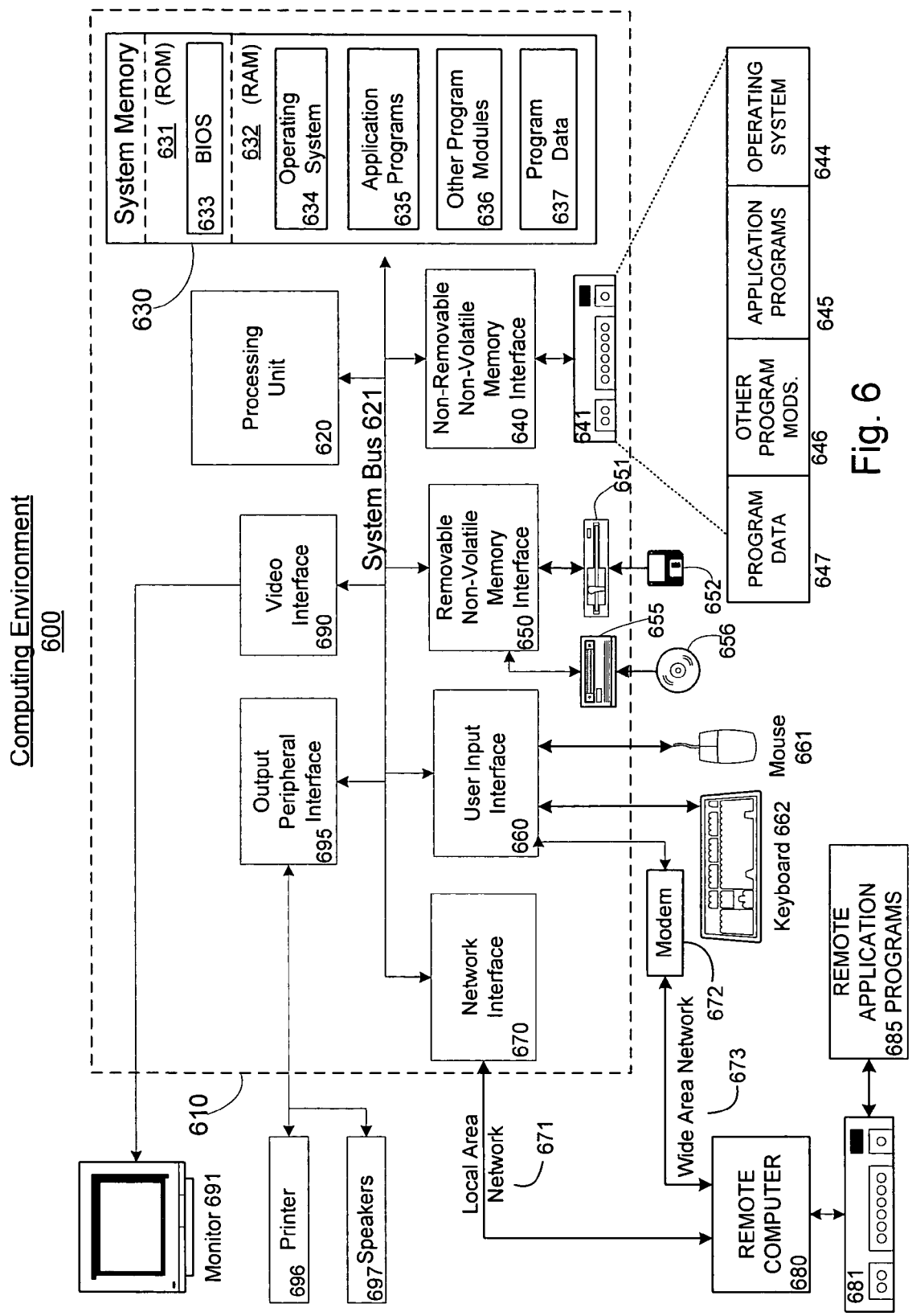

LOGON AND MACHINE UNLOCK INTEGRATION

BACKGROUND

User authentication onto a computer system is typically accomplished with a user identification and password or smartcard together with access control mechanisms. These are effective ways of providing access control for data when an operating system (OS) is running. When the OS is not running, most platforms require other mechanisms to protect data, because the disk containing the data and access control restrictions can be mounted by an OS that does not honor the access control proclamations associated with the data to be protected.

In such circumstances, encryption technology is commonly employed so that data accessed by an unauthorized operating system is unreadable. Such data is generally contained on disk storage such as a hard disk drive (magnetic or optical). If encryption of the disk is used, then the key used to encrypt the data must itself be protected. There are a variety of technologies that are widely employed to protect keys. Common techniques include deriving the key from a password or saving the key on a storage device, itself perhaps protected by a key, such devices may include a smartcard or USB-token. Other ways to protect keys include deriving or gating access to a key based on a biometric device which measures some physical element of the user or authenticating only the operating system to which the key is disclosed so that other operating systems that do not honor the access control metadata can be barred from disk access.

Password protection, the use of a smartcard or USB token, and the use of biometric devices are only useful if a user is present. As such, they are employed by encrypted file systems but only for user or administrator-configured storage locations. This is done because there is no user present for much of the uptime on an OS. The problem with this is that applications and the system do not necessarily put all of the data that a user needs to protect in these protected locations. Part of this is poor application design, but part of it is a necessary consequence of the OS being a multi-user platform.

To avoid the placement of confidential data in unencrypted portions of the disk, the simple measure of encrypting the whole disk and deriving the encryption key from a user-entered credential may be used. But the following problems can arise; a) the OS cannot boot without a user present, b) the user requires two credentials: one to derive a disk decryption key and allow the OS to boot, and one to log on to the system, or c) the user logs on twice but uses the same credential each time: effectively turning the PC into a single user device. Other problems with user credentials in managed environments include the fact that a domain password can be changed when the OS is offline.

It is desirable to address the multiple credential entry requirement when operating with a multi-user system where the OS is encrypted on a storage disk The present invention addresses these and other concerns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The undesirable double logon aspect present in the prior art can be overcome in a multi-user environment where an operating system and other computer resources are protected via disk storage encryption. In such a system, one solution is to add a communication path that allows a pre-operating system component or module to pass a credential to a logon component of the operating system. The single-user management aspect of the prior art can be addressed by providing a protected database of authorized users that is updated by the domain administration system when the OS is running. This database is used during boot to authenticate users and derive disk encryption keys.

BRIEF DESCRIPTION OF THE DRAWINGS

In the drawings:

FIG. 6 is a block diagram showing an example host computing environment.

DETAILED DESCRIPTION

Exemplary Embodiments

Figure 1:
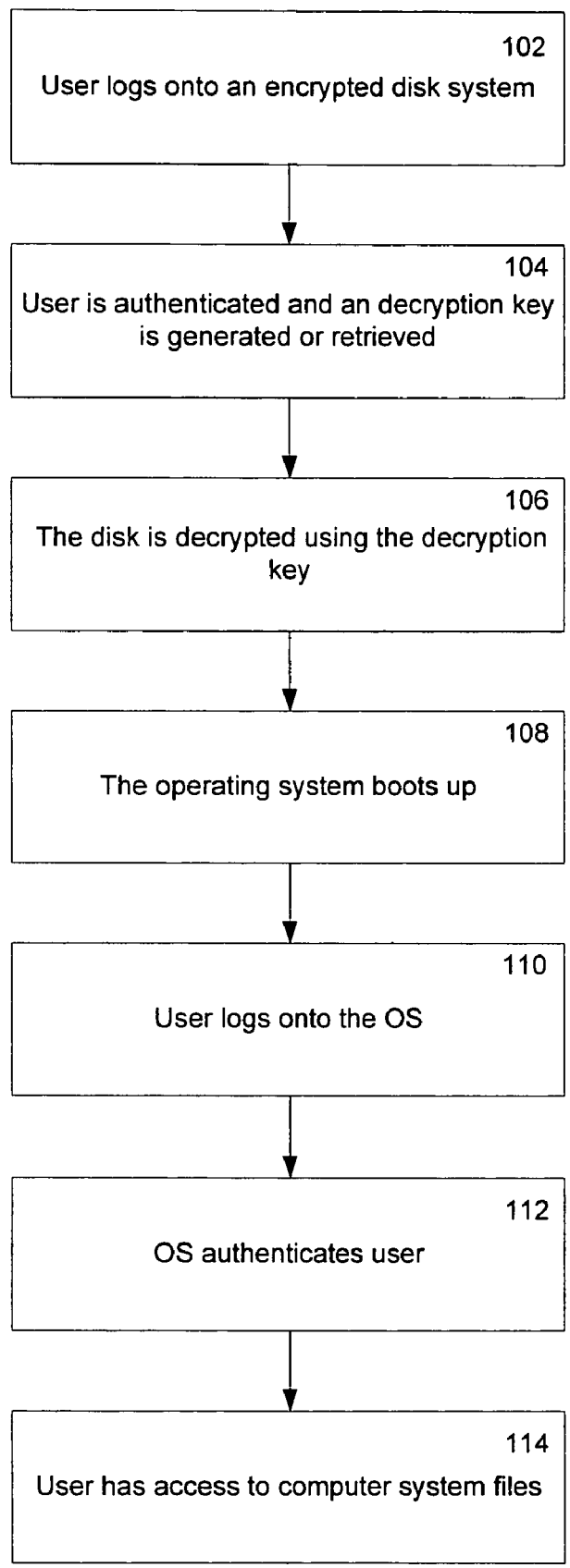
FIG. 1 is a flow diagram showing a prior art scheme of gaining access to an encrypted OS.

FIG. 1 is a flow diagram of a typical prior art method of logging onto a computer system having an encrypted disk. Here, the assumption is that the computer system includes a disk that has an encrypted portion and an unencrypted portion. An equivalent of this scenario includes the configuration where two or more disks are used; at least one is encrypted and at least one is unencrypted. The method 100 begins as a user logs into the encrypted disk computer system (step 102). In performing this step, the computer system accesses an unencrypted part of the disk that allows interaction with a user. This may be referred to as a Pre-OS module because it is active before the encrypted OS is available to the user. The user information, such as a username, password, smartcard or other user information is authenticated and a decryption key is generated based on the users information (step 104). Once a decryption key is generated, the key is used to decrypt the encrypted portion of the disk (step 106).

Once the encrypted portion of the disk is decrypted, the operating system (OS) that resides on the now-decrypted disk is allowed to boot (step 108). This opens up a login program that prompts the user to once again provide login information. The user logs into the computer system a second time (step 110) by providing a username and password. The OS now authenticates the user information (step 112). And the user then has access to the computer system resources such as operating system capabilities and application programs and data.

The method 100 of FIG. 1 demonstrates that an encrypted system as described requires a first login of user information for authentication by a Pre-OS software module in order to generate a key for unlocking the encrypted disk. After the disk is unlocked and decrypted, the user has to again log on in order to access the OS resources. This second login can be avoided using aspects of the invention.

Figure 2:
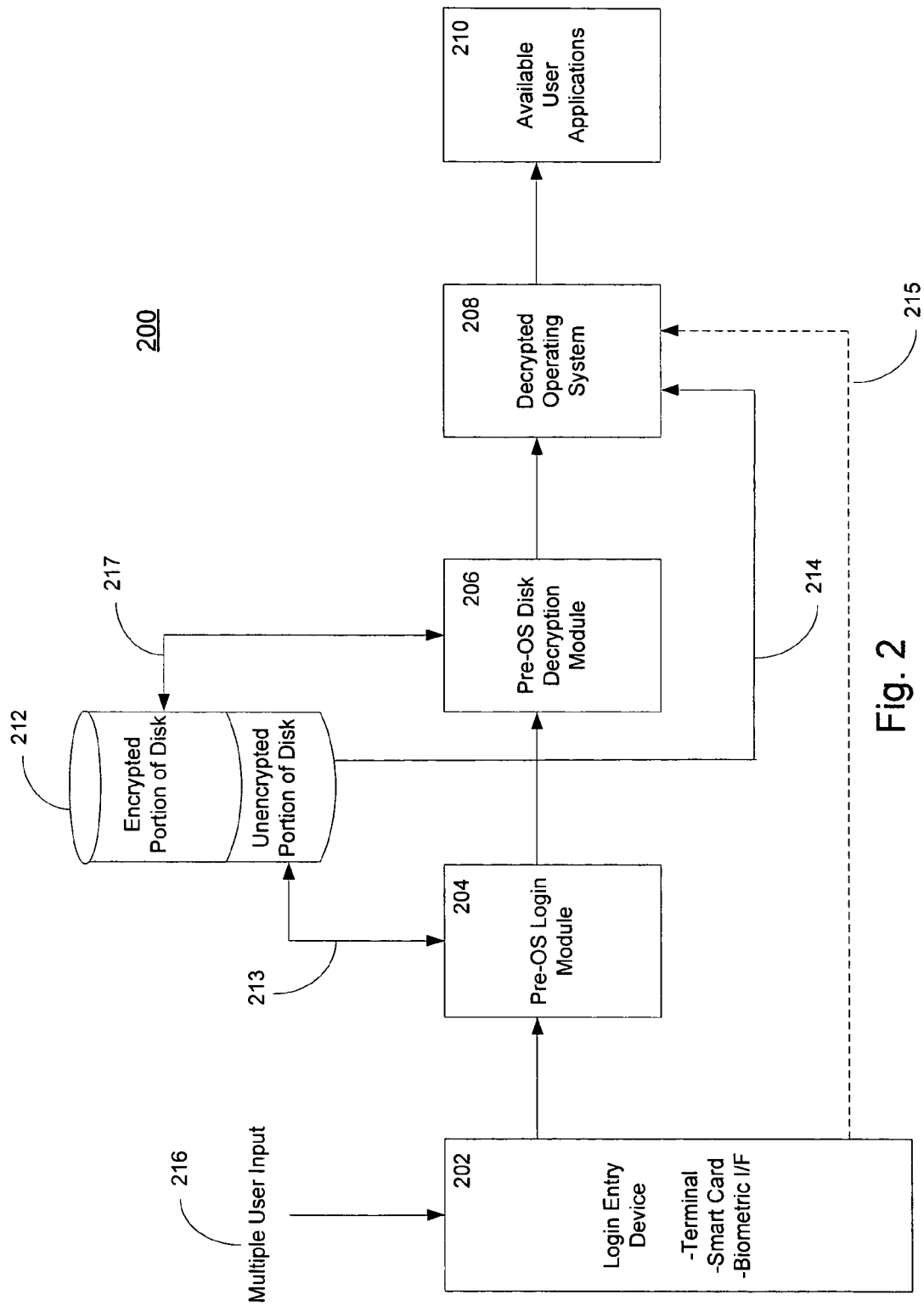
FIG. 2 is an example block diagram depicting functional aspects of the invention.

FIG. 2 is block diagram depicting an encrypted disk computer system 200 having aspects of the invention. The encrypted disk 212 of the computer system is graphically depicted as having two portions; an unencrypted portion and an encrypted portion. In an alternative embodiment, the computer system may include two separate disks; one unencrypted and one encrypted. Either topology is equivalent in this context. In yet another alternative embodiment, firmware, such as BIOS, may collect the password and all of the disk 212 may be encrypted. For descriptive purposes, the single disk with an encrypted portion and unencrypted portion will be used as a reference. But, those of skill in the art will recognize that the alternative embodiments above may be used. A login entry device 202 is used by any of a multiplicity of users via user input 216. The login entry device may be a conventional computer terminal or a terminal in connection with a smart card, or a terminal in connection with a biometric device or any combination thereof.

User credential information flows from the login entry device 202 to the Pre-OS login module 204 which represents a software component of the unencrypted portion of the disk 212. The Pre-Login Module 204 can authenticate the user as a bona fide user of the computer system. The user credential information may also be placed in storage, such as on the unencrypted portion of the disk via link 213. Once authenticated, the pre-OS module 204 can generate a decryption key for the disk 212. The encryption key is transferred from the Pre-OS Module 204 to the Pre-OS disk decryption module 206 where the encrypted portion of the disk 212 is accessed via link 217 and the encrypted portion of the disk is decrypted using the decryption key. Once the decryption is complete, the decrypted OS 208 is able to boot up. The Pre-OS logon module 204 may access an unencrypted portion of a disk, a separate storage location, or an element such as a BIOS module.

At this point the OS can re-use the credentials of the user by accessing the stored credential information. For example, if the stored credential information were placed on the unencrypted portion of that disk as previously described, link 214 may be used. The user credentials are then automatically recalled and used to login the user onto the decrypted OS. The user is then able to access the resources of the computer system, such as the applications 210 without having to re-enter his credentials or any other form of user login information. This contrasts with the FIG. 1 scenario where the user was required to enter in his information twice to access the OS resources.

In another aspect of the architecture of FIG. 2, successive users, such as other registered users of system 200, may log onto the system via the login entry device. In this situation, where the OS is already operating, the login entry device 202 can provide the new users' credentials directly to the decrypted OS via link 215. Thus, a multi-user capability can be implemented in the present single login encrypted disk computer system.

Thus, a credential generated via a user password, smartcard, or biometric device that is collected early in boot or even pre-boot by the BIOS may be used to derive a disk encryption key for the entirety or vast majority of the data on the hard disk. The architecture of FIG. 2 employs a communications path from the early boot or pre-boot environment to the logon manager (i.e. WinLogon™ on the Windows™ system available from Microsoft® Corporation of Redmond Wash.) that allows the early boot authentication information to be re-used. In the architecture of FIG. 2, the communications channel includes path 213 to for storage and path 214 for retrieval of the user credential information. In another aspect the storage of the user credential information via path 213 is a caching of user credential information and can be performed using any memory element available to the pre-OS components. The caching of the credential information is preferably performed using a secure storage technique to prevent unauthorized access.

In general, the details of the data that needs to be transferred will depend on the authentication mechanism used. In the case of password-logon, the pre-OS component might collect a user name, domain name and password, and if the pre-OS authentication succeeds, also yielding a disk decryption key, this information is passed to the logon component to automatically log the user on to the system.

For smartcard authentication, the user provides a PIN which enables access to keys on the smartcard for unlocking of access to the disk decryption key. Here, user credentials are also stored for later use to avoid a second set of logon information from being required of a user. For biometric authentication, the minutiae are typically matched against a template in the logon device and then used to unlock a local credential store containing a key or password. The pre-OS component could either pass the minutiae to the logon component for rechecking against a different database, or could pass the password or key.

The Windows™ OS already has a pluggable authentication architecture. This allows an embodiment to be implemented that comports with the current invention to collect a pre-OS credential and pass it to a disk encryption subsystem, and in turn to a custom logon provider. Alternately, the credential may be collected by firmware, such as a BIOS, and may be passed to the a disk encryption system. Thus, a standard interface and third-party collected credentials logon functionality may be built into an OS, such as Windows™, so that any pre-OS credential provider could enable single-sign-on without needing to write a custom interface. Windows™ derives EFS keys from logon credentials. In one embodiment, EFS may run with a key derived from the individual user's password.

In one aspect of the invention, the encrypted disk is encrypted with a single key. There are standard techniques for deriving a key from a password, but a computer is typically used by many users whose passwords are managed centrally and change often. Also, for security reasons, users should be discouraged from sharing passwords. These limitations mean that a user would normally need two passwords or the PC needs to be turned into a single user device.

Enrollment of a new user can be accomplished by having a database of the disk encryption key encrypted with every domain-authenticated user available in the pre-OS environment. This database may be the same as or separate from the disk 212. Access to the disk may be implemented in either pre-OS module 204 and/or 206. When a user tries to logon, the users' domain, username, and password are used to select a Binary Large Object (BLOB, not shown) that the key recovery entity tries to decrypt with the supplied password. If the decryption succeeds, then the key is used to decrypt the rest of the disk 212 and continue boot the OS. In one embodiment, the database contains a disk encryption key encrypted by the user-credential key obtained for each user.

In one aspect of the invention, the database of authenticated users is updated when the OS is running and actively managed (e.g. domain joined). If the OS is booted often, this technique can also be used to ensure that password changes on other machines are properly propagated to the computer being protected. In the non-domain joined/managed case, the problem of adding users and keeping the password database up-to-date is easier because the OS is always running when users are added or passwords are changed. A database of authenticated users may be accessed either remotely or locally. The database may be updated via a remote pushdown of data as needed or on a periodic basis. User information may be added, deleted, or modified via standard database manipulation.

A similar management technique could be used with a smartcard. In this embodiment, the smartcard contains the user key protected by a PIN. The user key is used similarly as the password is as mentioned above. Biometric authentication may require a database of templates, possibly within the device, for all authenticated users and corresponding keys, encrypted to a key available only to the pre-OS environment.

Figure 3:
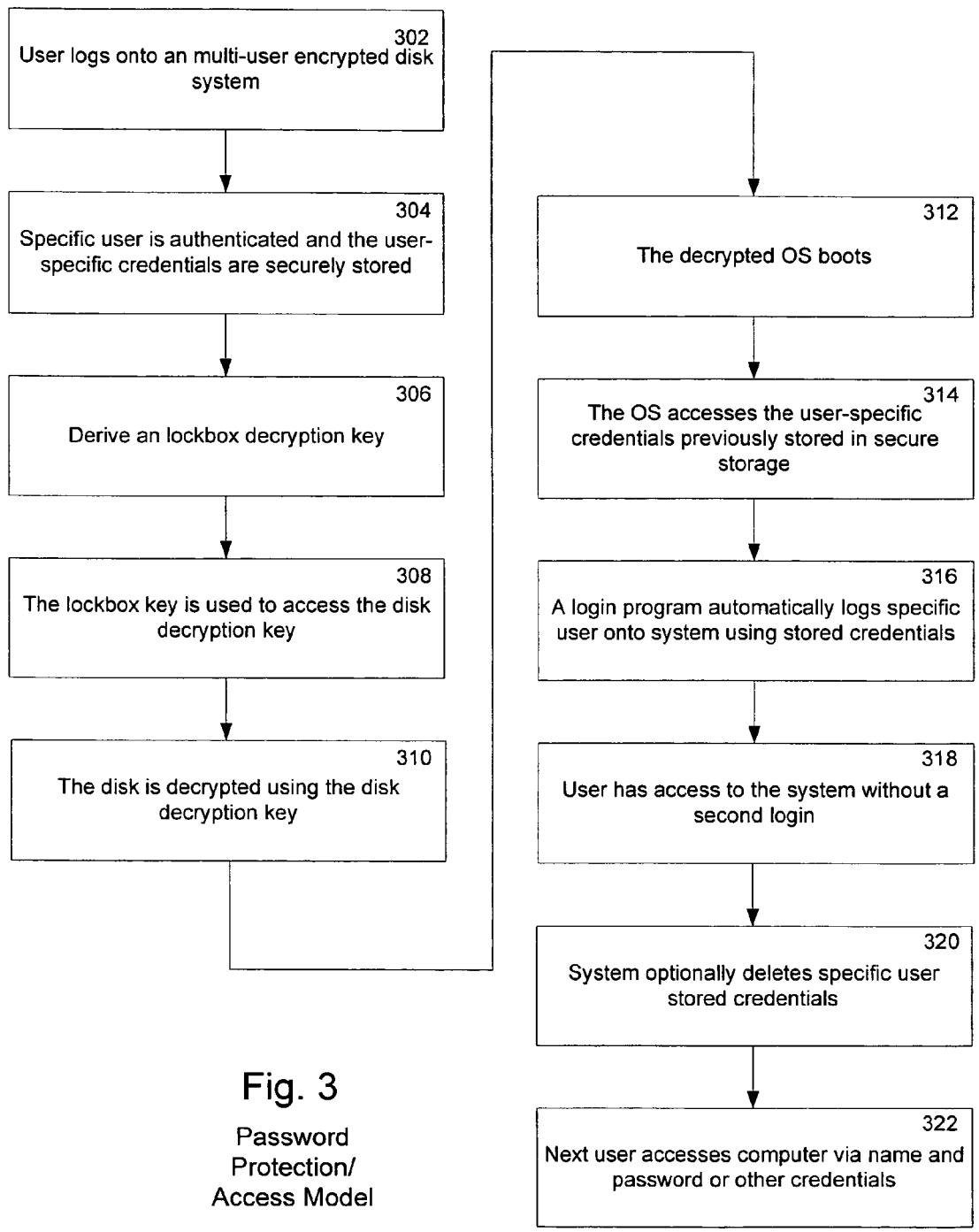
FIG. 3 is an example flow diagram showing an embodiment of a password protection and access method of the invention.

FIG. 3 is an example method 300 for a password protected system. In this instance, the multiple user login entry device 202 could be a computer terminal and its related user interface devices such as a display, mouse and keyboard. In the method 300 of FIG. 3, the user logs onto the multi-user encrypted disk system (step 302). The specific user is authenticated and the user-specific credentials are securely stored (step 304). After authentication, a lockbox encryption key is derived. This step may involve generating a hash of the users input information, such as domain, username, and password, and using the hash to generate a decryption key. Other techniques to derive a key known to those of skill in the art may also be used. In this context, a lockbox key is a key to a "lockbox" which is a secure container for a disk decryption key. Step 306 derives the lockbox key and step 308 is performed to access the disk decryption key.

The disk decryption key is used to decrypt the encrypted disk (step 310). Once the disk is decrypted, the now-decrypted OS can boot (step 312). Any new data that the OS writes is preferably encrypted with the proper encryption key. The OS accesses the user-specific credentials previously stored the secure storage location (step 314). These credentials are then used by the OS login program to automatically log in the specific user onto the computer system (step 316). This action avoids the entry by the user of his login information or his credentials. The specific user now has access to the system with out the user performing a second login (step 318). According to another aspect of the invention, a subsequent different user can use the computer terminal to directly log into the running OS using his domain, username, and password or other equivalent credentials.

Figure 4:
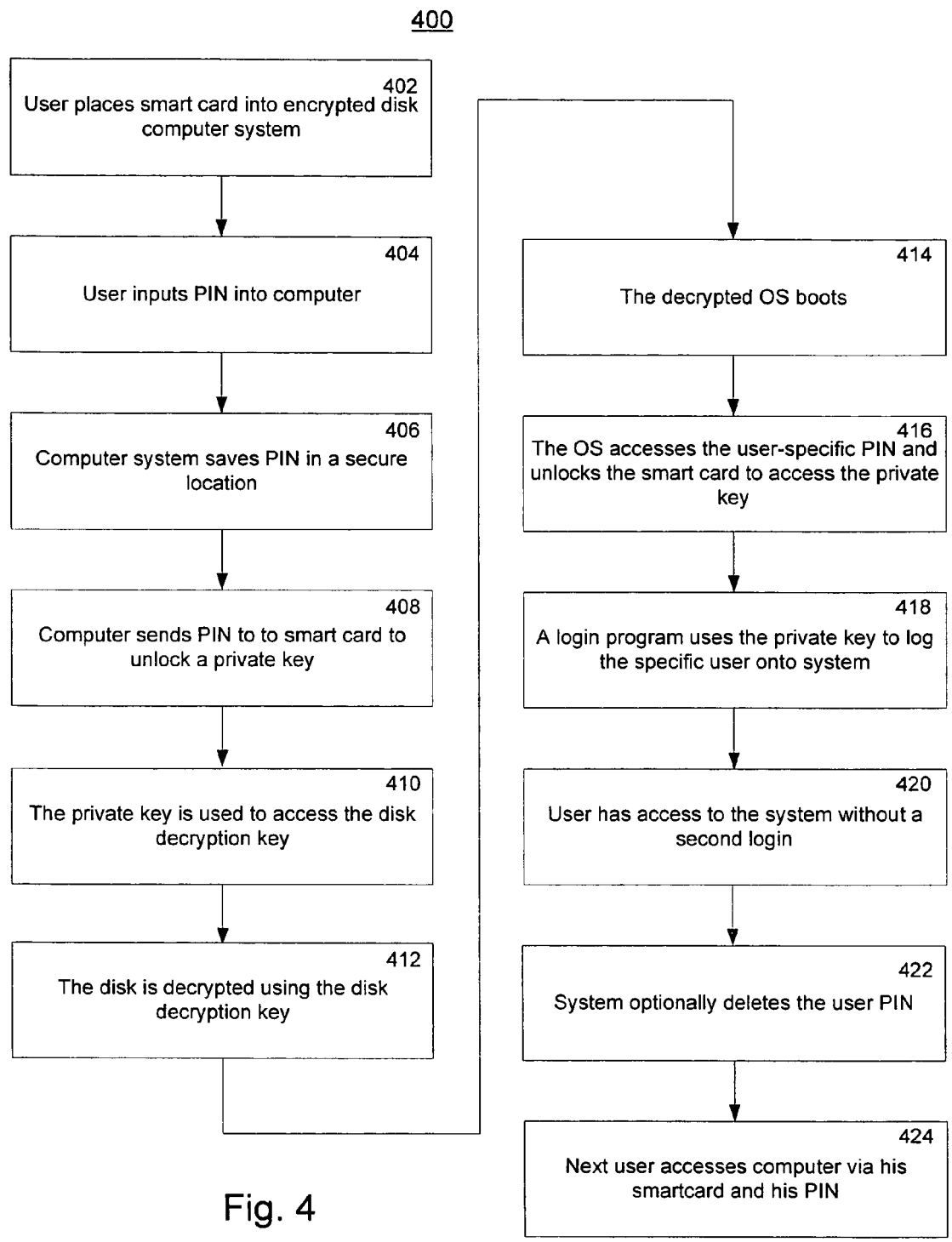
FIG. 4 is an example flow diagram showing an embodiment of a smartcard protection and access method of the invention.

FIG. 4 is an example method 400 for a smartcard protected system. In this instance, the multiple user login entry device 202 could be a computer terminal including a smartcard reader and related computer terminal user interface devices such as a display, mouse and keyboard. In the method 400 of FIG. 4, the user logs onto the multi-user encrypted disk system by placing the smart card into the smartcard reader of the encrypted disk computer system (step 402). The reader reads the smartcard and the terminal prompts the user for a personal identification number (PIN). In this instance it is envisioned that the smartcard is one having the capability to generate or deliver a private key to the computer system upon a verification of the user. The smartcard may include contacts or be contactless, but is preferably interactive with the smartcard reader and computer system. After the prompt, the user enters a PIN (step 404).

The computer system saves the PIN in a secure storage area for later use (step 406). The computer sends the PIN to a the smart card to unlock a private key (step 408). The private key is used to access the disk decryption key (step 410). At this point, the encrypted disk may be decrypted using the disk decryption key (step 412). This action allows the decrypted OS to boot (step 414).

As the OS boots, a login program of the OS automatically access the user-specific PIN from the secure storage location and unlocks the smart card to access the private key (step 416). The private key may then be used by the OS login program to log in the specific user onto the newly booted OS (step 418). Thus, the specific user has access to the system without re-entering his PIN or other identifying information for the smartcard to allow access into the system OS (step 420). Optionally, after the system has logged on the specific user onto the system, it may delete the user PIN or other identifying information form the secure storage location (step 422). If a subsequent different user arrives to access the computer system, use of his smartcard would allow access to the computer OS directly using his PIN (step 424) because the system OS is up and running and entry via a pre-OS module is unnecessary.

Figure 5:
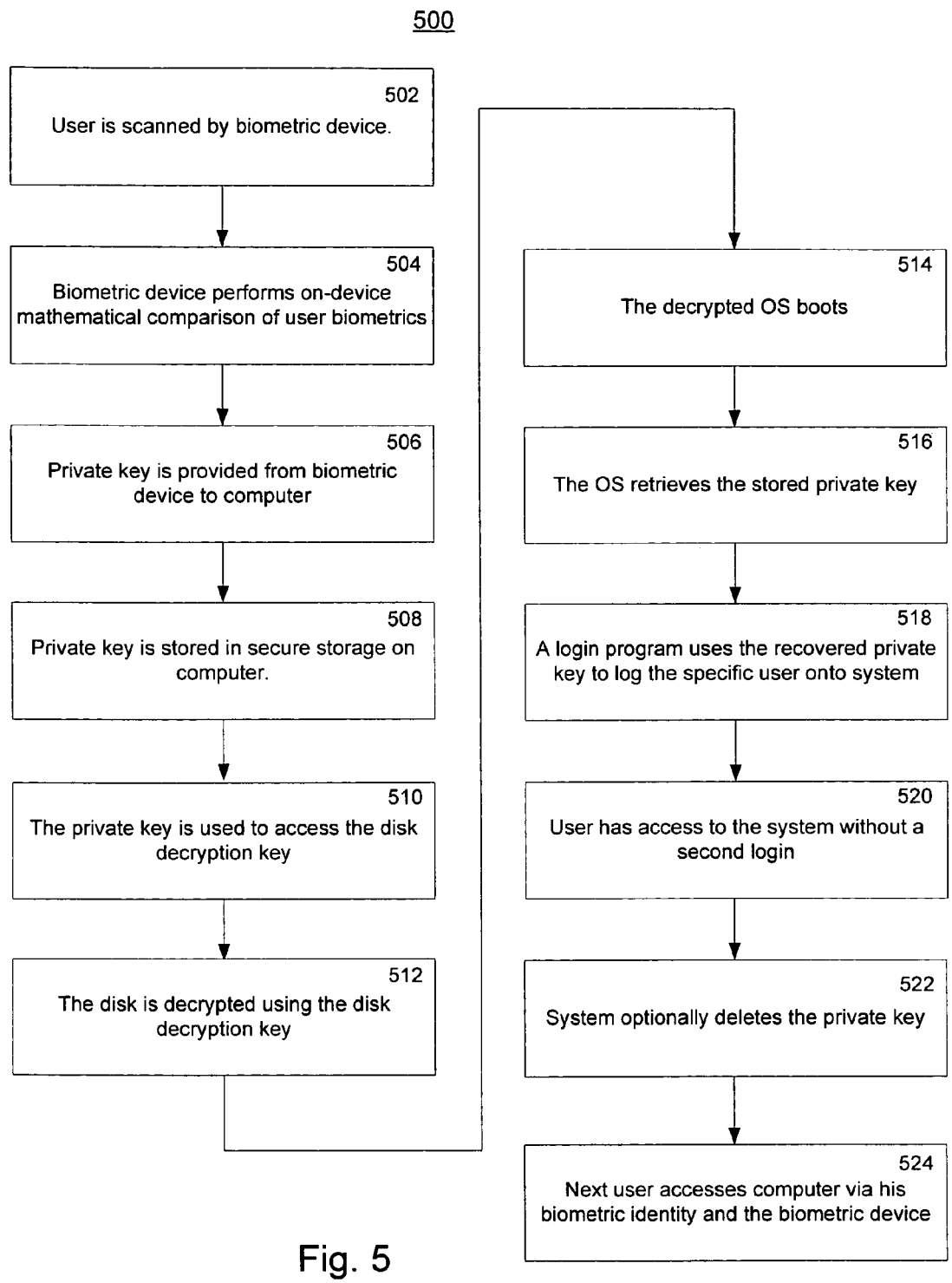
FIG. 5 is an example flow diagram showing an embodiment of a biometric protection and access method of the invention.

FIG. 5 is an example method 500 for a biometric device protected system. In this instance, the multiple user login entry device 202 could be a computer terminal including a biometric device and optional related computer terminal user interface devices such as a display, mouse and keyboard. In the method 500 of FIG. 5, the user logs onto the multi-user encrypted disk system by allowing the biometric device to scan a portion of the user (step 502). Such scans may include scans of the eye, fingerprint, handprint, or any other biometrically obtained user parameter. In this instance, it is assumed that the biometric device used contains or has access to a mathematical comparison means for verifying the minutiae obtained from the user compares to data in a template. Thus, the biometric device itself can return an indication of a successful biometric match. Returning to FIG. 3, the biometric device performs an on-device mathematical comparison of the user biometrics (step 504).

Upon successful match of the biometric minutiae, the biometric device provides a private key to the computer system (step 506). The private key may then be stored in a secure storage location (step 508). The private key is used to access the disk decryption key hidden in a secure location on the computer (step 510). The encrypted disk is then decrypted using the disk decryption key (step 512). Once the encrypted disk having the OS is decrypted, the decrypted OS boots up (step 514). A login program or utility of the OS can then access the stored private key (step 516) by retrieving it from the secure location. The recovered private key is then used to login the specific biometrically identified user onto the OS computer system (step 518). Thus the user has access to the OS and other computer system resources without a second login or second use of the biometric identification device (step 520). The computer system may then optionally delete the private key from the secure location to enhance security of the private key (step 522). The next user of the system can then simply use the biometric identification technique to log onto the OS directly because the OS is up and running.

It should be noted that in FIGS. 3, 4, and 5, the storage of the user information, PIN, or private key into secure storage location may be performed anytime after data to be stored is available but before it dissipates. For example, the PIN in FIG. 4 may be stored after the PIN is used to unlock the private key used to access the disk decryption key.

As an aspect of the invention, a computer-readable medium, such as, but not limited to, magnetic storage devices, optical devices, such as CD and DVD media may be used to store computer program instructions which can implement methods discussed or suggested herein. Such computer media are envisioned to retain executable instructions for use on a general purpose computer to enable it to practice aspects of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

FIG. 6 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 6, an exemplary system for implementing an example host computer includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures.

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 633, application programs 635, other program modules 636, and program data 637.

The computer system 610 may also include other removable/non-removable, volatile/nonvolatile computer storage media. By way of example only, FIG. 6 illustrates a hard disk drive 631 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 644, application programs 645, other program modules 646, and program data 647. Operating system 644, application programs 645, other program modules 646, and program data 647 are given different numbers here to illustrate that, at a minimum, they are different copies.

A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for re-using user login credentials to eliminate a second credential entry. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to collect user credentials in a computer system having an encrypted disk, the method comprising:
   receiving user-specific credentials by the computer system, wherein the computer system comprises an unencrypted storage portion and an encrypted storage portion, the unencrypted storage portion comprising a credential entry program, the encrypted storage portion comprising an operating system and application programs;
   authenticating the user-specific credentials and storing the credentials in a storage area;
   generating a lockbox decryption key;
   using the lockbox decryption key to access a disk decryption key and decrypting the encrypted storage portion using the disk decryption key;
   booting the operating system, wherein a login program is activated, the login program automatically accessing the storage area to retrieve the user-specific credentials;
   automatically logging a user onto the computer system wherein a second entry of the user-specific credentials into the computer system is avoided, and whereby the user gains access to resources of the operating system.

2. The method of claim 1, further comprising:
   deleting the user-specific credentials from the storage area after automatically logging the user onto the computer system.

3. The method of claim 1, further comprising:
   allowing access to the resources of the operating system to any subsequent user that provides authorized credentials to the computer system login program.

4. The method of claim 1, wherein the user-specific credentials comprise one or more of a domain, a user name, and a password.

5. The method of claim 4, wherein generating the lockbox decryption key comprises deriving the lockbox decryption key from one or more of the user-specific credentials.

6. The method of claim 1, further comprising using a database to maintain user authentication information resident on the unencrypted storage portion.

7. The method of claim 6, wherein the database is accessed to perform at least one of addition, deletion, and modification of the user authentication information.

8. A method to collect user credentials in a computer system having an encrypted disk and a smartcard interface, the method comprising:

receiving a smartcard in a card reader, the card reader in communication with the computer system which comprises an unencrypted portion of storage and an encrypted portion of storage, the unencrypted portion comprising a user authentication program, the encrypted portion comprising an operating system and application programs;

receiving a personal identification number (PIN) identifying a user as part of the user authentication program and storing the PIN in a storage location;

using the PIN to identify the user to the smartcard and unlocking a smartcard private key for use by the user authentication program;

using the private key to access a disk decryption key and decrypting the encrypted portion using the disk decryption key;

booting the operating system, wherein a login program is activated, the login program automatically accessing the storage area to retrieve the user PIN;

automatically entering the retrieved PIN into the smartcard to access the private key; and using the private key in conjunction with the login program to log the user onto the computer system, wherein the user avoids a second entry of the PIN into the computer system, and whereby the user gains access to resources of the operating system.

9. The method of claim 8, further comprising:

deleting the PIN from the storage area after automatically logging the user onto the computer system.

10. The method of claim 8, further comprising:

allowing access to the resources of the operating system to any subsequent user that submits an authorized smartcard and PIN to the login program of the operating system.

11. The method of claim 8, wherein receiving the smartcard in the card reader comprises one of receiving a smartcard in a contact smartcard reader and receiving smartcard information via a contactless smartcard reader.

12. The method of claim 8, further comprising using a database to maintain user authentication information resident on the unencrypted portion for use with the user authentication program.

13. The method of claim 12, wherein the database is accessed to perform at least one of addition, deletion, and modification of the user authentication information.

14. A method to collect user credentials in a computer system having an encrypted disk and a biometric device, the method comprising:

receiving biometric data from a user scan via the biometric device which performs on-device biometric data comparisons and outputs a private key if a match occurs, the biometric device in communication with the computer system which comprises an unencrypted portion of storage and an encrypted portion of storage, the unencrypted portion comprising a biometric device interface program, the encrypted portion comprising an operating system and application programs;

receiving the private key and storing the private key in a secure storage location;

using the private key to access a disk decryption key and decrypting the encrypted portion of the disk using the disk decryption key;

booting the operating system, wherein a login program is activated, the login program automatically accessing the secure storage area to retrieve the private key;

automatically using the retrieved private key in conjunction with the login program to log the user onto the computer system, wherein the user avoids a second scan by the biometric device, and wherein the user has access to resources of the operating system.

15. The method of claim 14, further comprising:

deleting the private key from the secure storage area after automatically logging the user onto the computer system.

16. The method of claim 14, further comprising:

allowing access to the resources of the operating system to any subsequent user that submits authorized biometric data to the biometric device which provides a private key to the login program of the operating system.

17. The method of claim 14, further comprising using a database of templates in the biometric device to accommodate multiple users of the computer system.

18. The method of claim 14, wherein receiving biometric data from a user scan via the biometric device which performs on-device biometric data comparisons and outputs a private key if a match occurs comprises receiving biometric data from a device that mathematically compares user biometric data with a user minutiae template and outputs a private key if a match is present.

* * * * *